United States Patent [19]

Havalda

[11] 4,123,360
[45] Oct. 31, 1978

[54] METHOD AND APPARATUS FOR THE LIQUID TREATMENT OF FILTER CAKES

[75] Inventor: Paul Havalda, Arlesheim, Switzerland

[73] Assignee: Ciba-Geigy Corporation, Ardsley, N.Y.

[21] Appl. No.: 672,915

[22] Filed: Apr. 2, 1976

[30] Foreign Application Priority Data

Apr. 4, 1975 [CH] Switzerland .................... 4295/76

[51] Int. Cl.² .................... B01D 33/00; B01D 33/34
[52] U.S. Cl. .................... 210/216; 210/219; 210/383; 210/400
[58] Field of Search .................... 210/198 R, 209, 216, 210/217, 219, 386, 387, 391, 393, 400, 401, 402, 383

[56] References Cited

U.S. PATENT DOCUMENTS

| | | | |
|---|---|---|---|
| 1,304,253 | 5/1919 | Bird | 210/393 |
| 1,475,244 | 11/1923 | Rolls | 210/386 X |
| 2,092,111 | 9/1937 | Dons et al. | 210/386 X |
| 2,097,529 | 11/1937 | Nordell | 210/393 |
| 3,891,459 | 6/1975 | Carmel et al. | 210/386 X |

Primary Examiner—Morris O. Wolk
Assistant Examiner—Arnold Turk
Attorney, Agent, or Firm—Harry Falber

[57] ABSTRACT

Method and apparatus for the liquid treatment of filter cakes formed as a layer on a moving filter web. The method comprising removing portions of the cake from the web by agitators having vanes which break up part of the cake on the filter and move the portions into a cover over the agitators where treatment liquid is injected to treat the portions removed from the web. The treated portions are then returned to the moving web at substantially the same place from whence they were removed.

12 Claims, 13 Drawing Figures

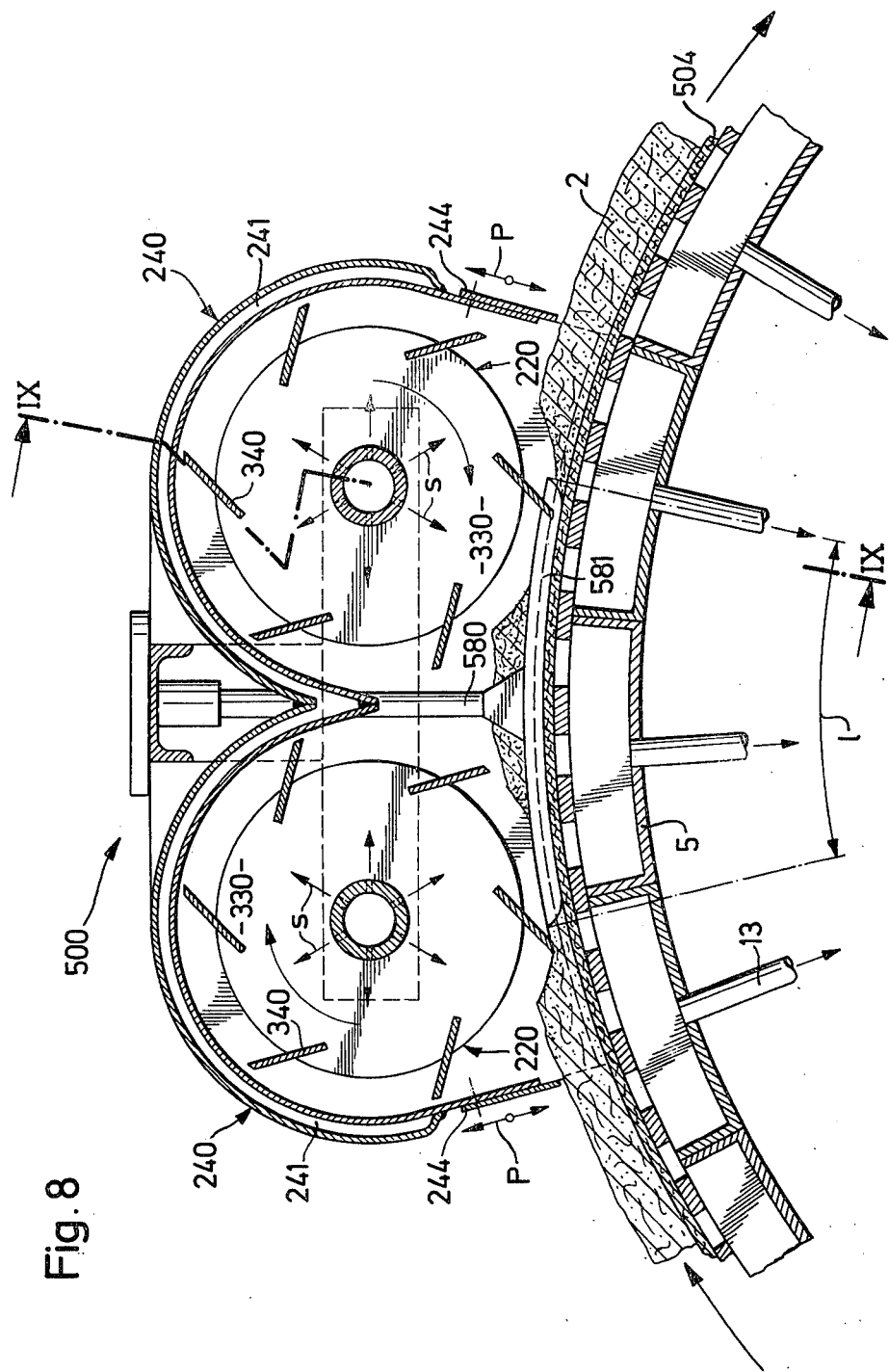

METHOD AND APPARATUS FOR THE LIQUID TREATMENT OF FILTER CAKES

This invention relates to a process for treating layers formed on filters with liquids.

FIELD OF THE INVENTION

Filter cakes produced during filtration usually have to be treated with a liquid, and are usually extracted so that a particular pH value can be achieved.

PRIOR ART

According to the prior art, the filter undergoes liquid treatment either directly (in situ) or in physically separated agitating boilers. In the in situ method the liquid is applied directly to the cake on the filter. As a rule, this method does not provide adequate suspension of the cake and is therefore usually unsatisfactory. In the second method the effect is improved considerably by the simultaneous action of mechanical forces; unfortunately, the latter method has inter alia the disadvantage that the continuity of the complete process is interrupted.

OBJECT OF THE INVENTION

It is an object of the invention, to obviate these disadvantages by using a process and apparatus which makes it possible to have satisfactory in situ liquid treatment of a filter cake without interruption of the filtration process.

BRIEF REVIEW OF THE INVENTION

According to the invention, therefore, portions of the layer of material are removed from the filter during the liquid treatment, at least some of the portions being treated by the liquid, and returned at least once to the filter.

In the process according to the invention, the portions of the filter cake are repeatedly treated with fresh liquid, the liquid then being removed continuously from the filter. The conditions are therefore just as favourable as in countercurrent extraction columns. Since a large number of portions can be treated simultaneously, the process not only leads to very high efficiency in terms of the relationship between end effect, e.g. extent of extraction, and liquid consumption but to high performance. The process is therefore very well suited to modern high-speed vacuum belt filters.

In a preferred embodiment of the process according to the invention, the portions are removed from the filter cake at an acute angle to the directions of movement of the filter and are returned thereto along an oppositely extending arcuate path. Along these paths the portions have upon removal a velocity component directed oppositely to the direction of filter movement and at the apex of the arc are moving in the same direction as the filter.

If possible, the path of movement should be so devised that the portions are returned to substantially the same places on the filter, which has advanced in the meantime, as those from whence they were removed. This leads to optimal use of the length of the liquid treatment zone which can therefore be reduced considerably.

According to another variant of the process, the portions are accelerated to speeds of from about 0.5 to 10 m/sec., preferably from 3 to 5 m/sec.

As a means of further optimizing the process where the filter cake consists of solids suitable for forming a fluidized layer, a kind of fluidized layer can be formed from the solids above the filter and the treatment liquid directly injected into that layer.

In another variant of the process, the solids as they are being treated with the liquid experience the effect of mechanical forces adapted to break up the grains or agglomerations. Such forces can be identical with the removing or accelerating forces if the same are large enough, as is the case more particularly with the fluidized bed variant.

A particular advantage of the process according to the invention is that the apparatus required to carry the process into effect is surprisingly simple. Apparatus for performing the process comprises one or more rotatable motor-driven agitating elements which are disposed in spaced-apart and substantially parallel relationship to one another; a cover which extends over the agitating elements and which is open on one side; and means for supplying liquid to the operative region of the agitating elements.

In practice, the apparatus is placed with the open side at a distance above the filter of a filtration plant and within the liquid treatment zone thereof, the distance above the filter being such, or being so adjustable, that the or each agitating element is at a distance from the filter surface so as to engage and remove portions of a filter cake thereon. If the agitating elements operate at a high enough speed, the portions are hurled up into and form eddies within the cover over the agitating elements.

BRIEF DESCRIPTION OF THE DRAWINGS

FIG. 8 is a partial view, in section, of a drum filter with a liquid treatment apparatus;

FIG. 1 shows a vacuum belt filtration plant or apparatus 50 such as has been described in greater detail in Swiss Patent Specification 383 708, the plant being associated with a liquid treatment apparatus 20 in accordance with the invention.

Figure 1:
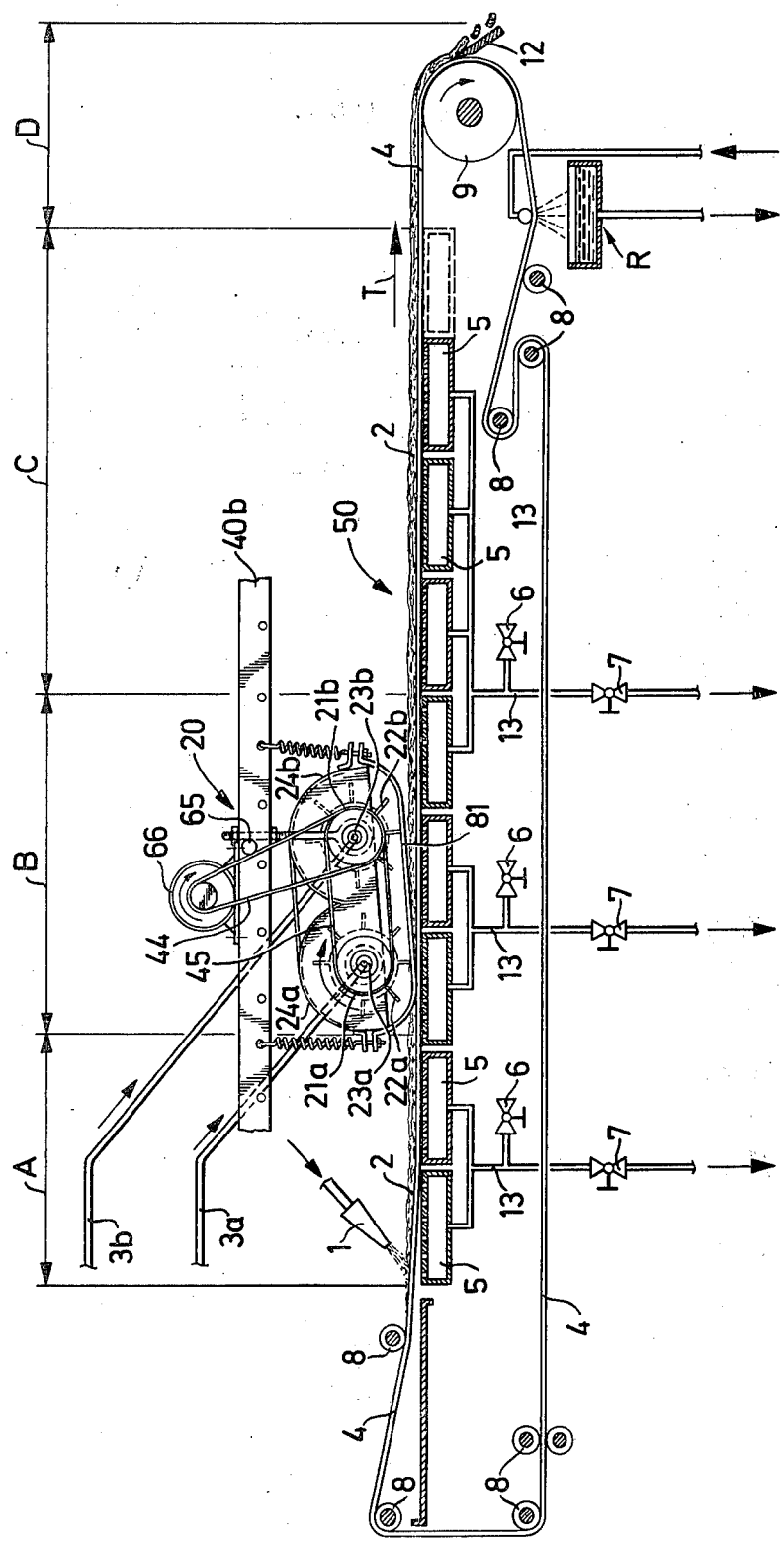
FIG. 1 is a diagrammatic view of a vacuum belt filtration apparatus adapted in accordance with the invention.

Troughs 5 are disposed below a filter belt 4 running over rollers 8 and 9 and which is driven continuously in the direction indicated by an arrow T, by means of a conveyor facility (not shown). Pairs of troughs 5 are connected by flexible lines 13, via valves 7 to a common extractor (not shown) and via valves 6 for venting. The troughs 5 are free to rise and move in the direction of the filter belt movement against the force of restoring means (not shown). During evacuation when the respective valve 7 is open and valve 6 closed, the troughs 5 rise by suction applied by the extractor and adhere to and move with the filter belt. When the valve 7 is closed and the valve 6 opened, suction ceases and the troughs 5 drop off the filter belt to be returned by the restoring means to their initial position, and so on. In more modern constructions the troughs 5 are driven and can be synchronized with filter belt movement.

The filter belt 4 passes serially through a separating zone A, a liquid treatment zone B, a drying zone C and, after passing over a roller 9 in zone D, a cleaning zone R.

In the separating zone A the suspension to be filtered is transferred to the filter belt by means of a feed device 1 and subsequently forms on the filter belt a filter cake 2 which moves with the filter belt. The thickness of the cake 2 is controllable by quantity control of the supplied suspension and by the speed of the filter belt. In the liquid treatment zone B the cake 2 formed in the zone A passes into the operative range of a liquid treatment unit 20. The unit 20 is mounted on girders 40a, 40b, shown in FIG. 3, of the machine frame and comprises two rotatably driven agitating elements 22a, 22b having agitating blades or vanes 34 as shown in FIG. 4 and which are disposed in parallel spaced-apart relationship to one another. Spindles 23a, 23b of the agitating elements extend substantially parallel to the filter surface. The unit 20 also comprises two covers 24a, 24b having openings facing the filter and two supply lines 3a, 3b for the supply of treatment liquid to the operative region of the two agitating elements 22a, 22b, which are driven by means of a motor 66 by way of a toothed belt transmission 44, 21b, 45 and 21a. As can be seen in the drawing, the hoods could be semicylindrical with the central longitudinal axis of the hood being coaxial to the axis of rotation of its respective agitator spindle.

The filter cake is brought into suspension and washed out in the unit 20, the cake being broken up into very small parts in the treatment chamber of the vanes 34, which move very fast in the opposite direction to the filter belt, the parts being intensively and intimately mixed with the treatment liquid which enters the treatment chamber under pressure.

After passing through the unit 20, the suspended material accumulates as a cake on the advancing filter belt. The treated cake is dried in zone C and removed by a scraper 12 from the filter belt in zone D. In the subsequent cleaning zone the now empty but still moving filter belt is cleaned with a washing liquid.

Figure 2:
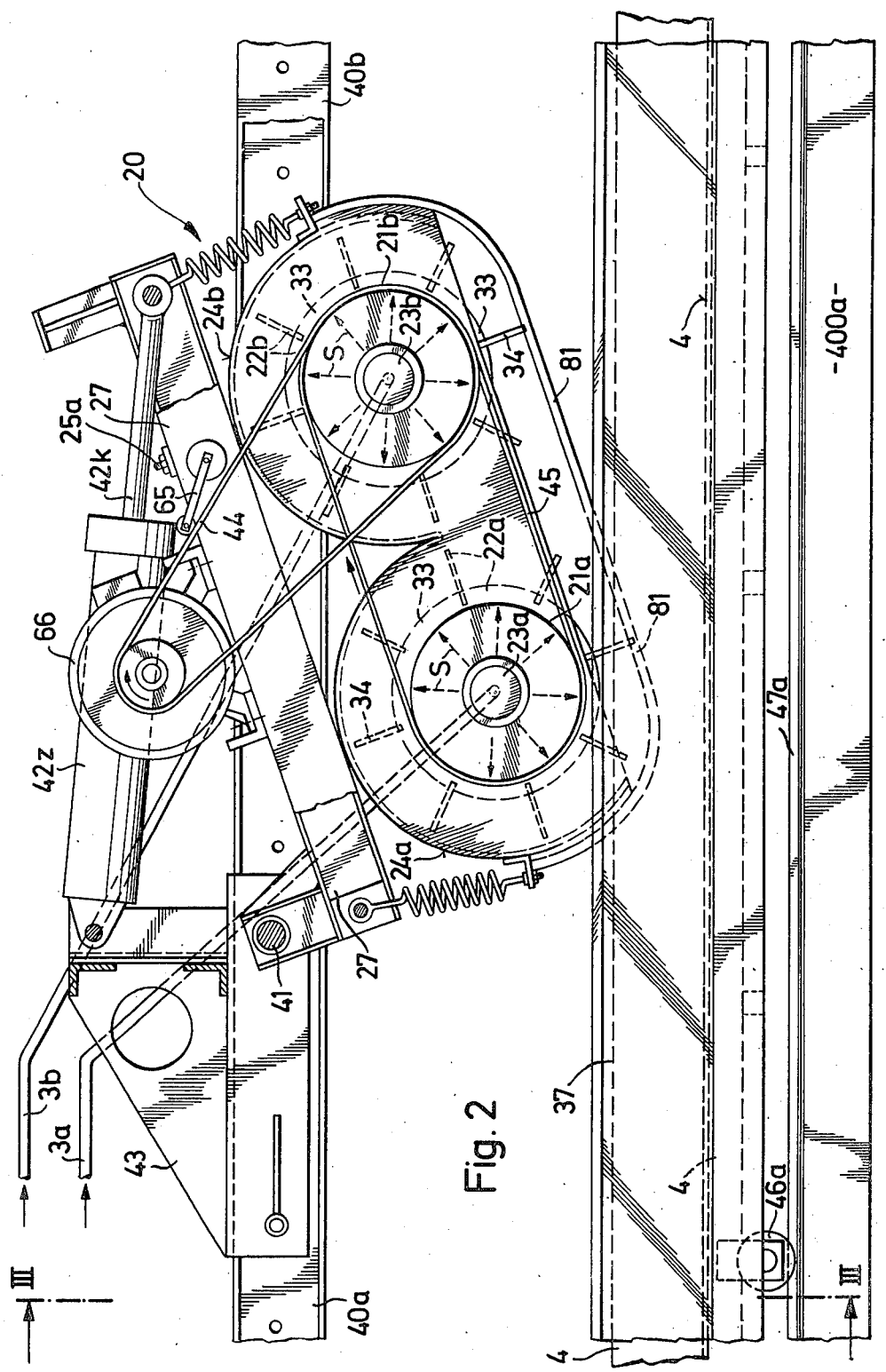
FIG. 2 shows the liquid treatment zone of the vacuum belt filtration apparatus of FIG. 1.
Figure 3:
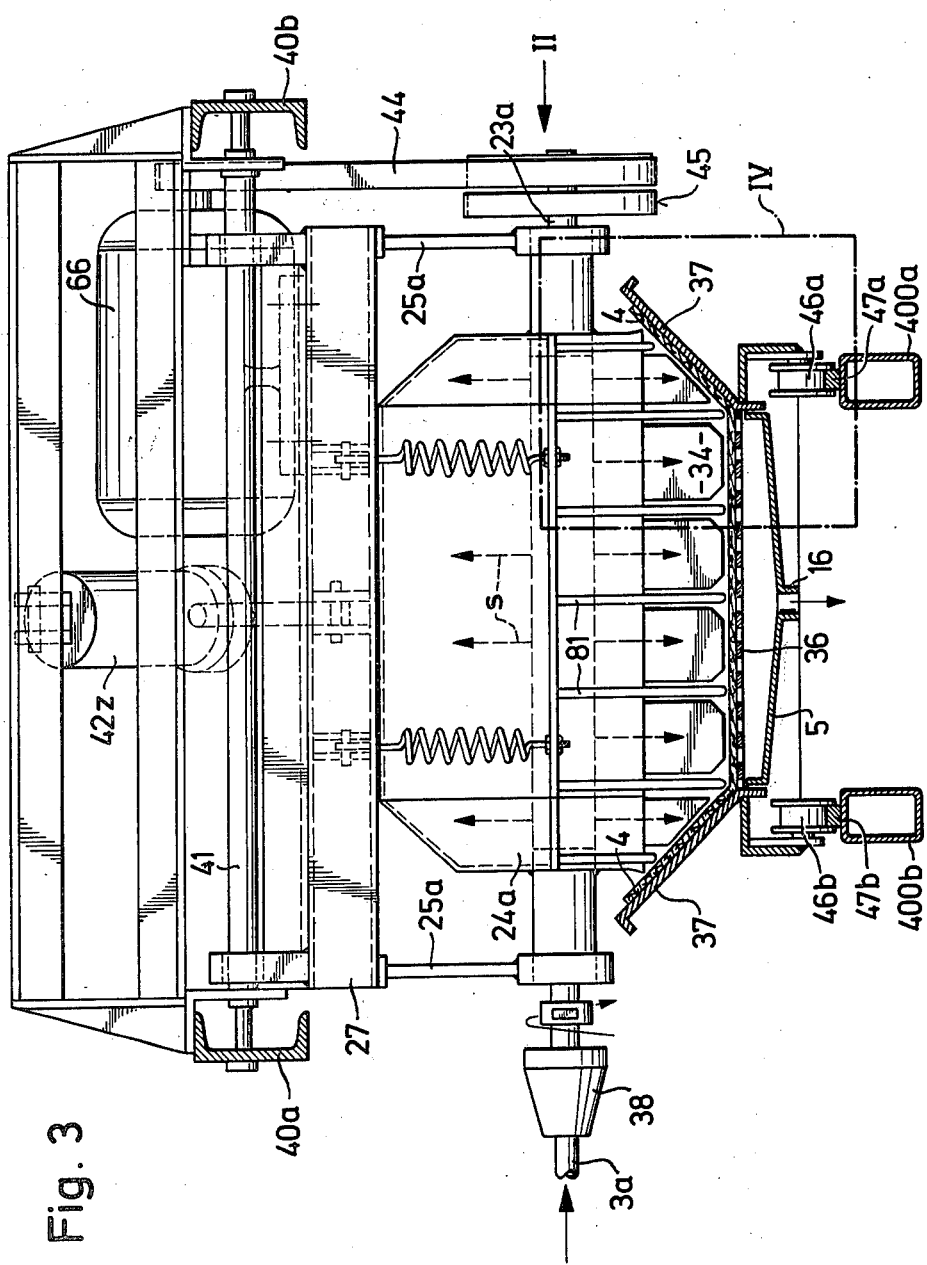
FIG. 3 is a section on the line III—III of FIG. 2.
Figure 4:
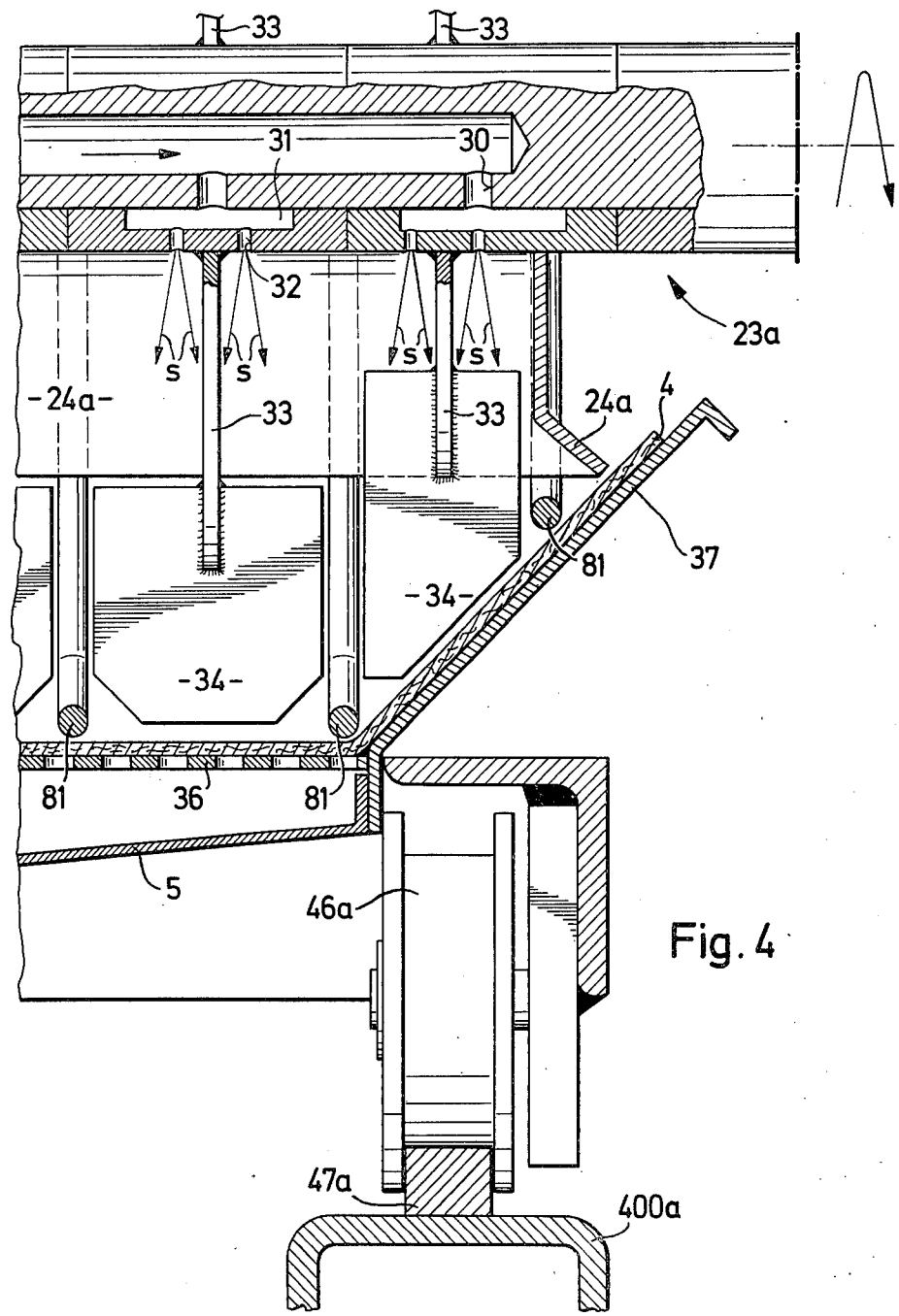
FIG. 4 is an enlarged and detailed view of the portion IV of FIG. 3.

FIGS. 2 to 4 are more detailed views, with minor variations, of the liquid treatment unit 20. The construction shown in FIGS. 2 to 4 differs from the basic construction shown in FIG. 1 mainly in that the liquid treatment unit 20 is connected as a whole by an intermediate frame 27 and a bracket 43 to two top girders 40a, 40b of the machine frame, the intermediate frame 27 being so articulated at one of its two ends to the bracket 43 as to be pivotable around a pivot 41. The other end of frame 27 is pivotally connected to the free end of piston rod 42k of a pneumatic or hydraulic cylinder 42z which is also pivotally connected to the bracket 43. Cylinder 42z is part of a pneumatic or hydraulic system (not shown). The geometric disposition of the articulation or pivot spindles or axes in such that the pivoted adjusting elements can provide optimum location of the unit 20 above the belt 4 and also enables the unit 20 to be separated therefrom by an adequate distance. If required, the pivoting system can be modified or replaced by a lifting device which can also be hydraulically or pneumatically operated. The bracket 43 is mounted on the girders 40a, 40b so as to be locatable anywhere thereon. The liquid treatment process can therefore always be performed at the optimum place of the filtration process, more particularly in a manner specific for the product being treated.

The agitating elements 22a, 22b comprise the spindles 23a, 23b, discs 33 disposed thereon in spaced relationship, and agitating vanes or blades 34 secured to the disc peripheries. The vanes 34 secured to each disc 33 together form a vane or blade ring. Spindles 23a, 23b are connected by struts 25a to frame 27 (FIG. 3). The covers 24a, 24b are semi-cylindrical hoods. U-shaped members 81 are disposed at each side of the hoods to prevent direct contact between the vanes 24 and the filter cloth and to make possible simple and exact adjustment of the separation between the agitating elements and the filter belt, the latter being in direct contact with the members 81. Instead of the members 81 protective rings extending around the vane rings could be used.

As described with reference to FIG. 1, the agitating elements are driven by means of an electric motor 66 and a transmission comprising toothed rings 21a, 21b and toothed belts 44, 45. Motor 66 is secured to frame 27. Preferably, the number of agitating elements is selected so that the filter cake portions engaged by the vanes are accelerated to speeds of from approximately 0.5 m/sec to 10 m/sec. Also, the vanes should strike the filter cake particles with sufficient impetus to have a grain-shattering or agglomerate-rupturing effect. The speed at which the agitating elements rotate can be adjusted by means of a variable transmission.

The treatment liquid is supplied through rotary couplings 38 to the hollow spindles 23a, 23b, as can be seen in FIG. 3 and FIG. 4. The liquid passes from the spindle interiors through radial channels 30 into distribution chambers 31 and therefrom through nozzles 32, disposed to the right and left of the discs 33 and into the operative region of the agitating elements. Arrows s indicate the direction of flow of the emergent liquid.

Figure 7:
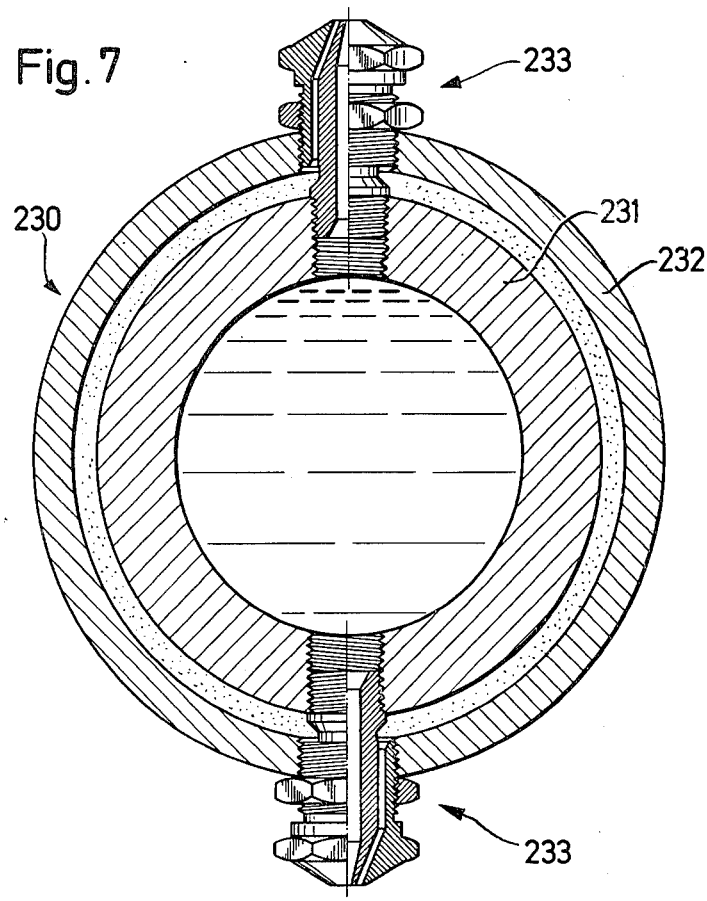
FIG. 7 is a section through an alternative form of spindle for an agitating element.

The spindles 23a, 23b can be made to supply two separate fluids from binary nozzles. Such a spindle is shown in FIG. 7. A spindle 230 comprises two coaxial hollow tubes 231, 232 maintained in spaced-apart relationship from one another by means disposed at the spindle ends. Binary nozzles 233 are located along the axis at diammetrically opposite positions, each nozzle having two passages which converge at the nozzle tip and which communicate with the interior of the inner tube 231 and with the interior of the outer tube 232 respectively. When spindles of the kind just described are used, the treatment liquid can, for instance, be atomized by means of compressed air or steam or compressed gas, so that more intimate contact with the eddied filter cake material can be achieved.

FIG. 2 shows the unit 20 when lifted away from the filter belt 4. For operation, the unit 20 is lowered on to the filter belt 4.

In the zones A, B and C the filter belt 4 passes through a trapezoidal trough 37 whose base 36 is a perforate sheet-metal member. The filter belt is wider than the base 36 and extends to the trough side walls.

The troughs 5 have rollers 46a, 46b running on rails 47a, 47b on two bottom girders 400a, 400b of the machine frame. The suction or extractor facility (not shown) is connected to spigot 16 of the troughs 5.

Figure 5:
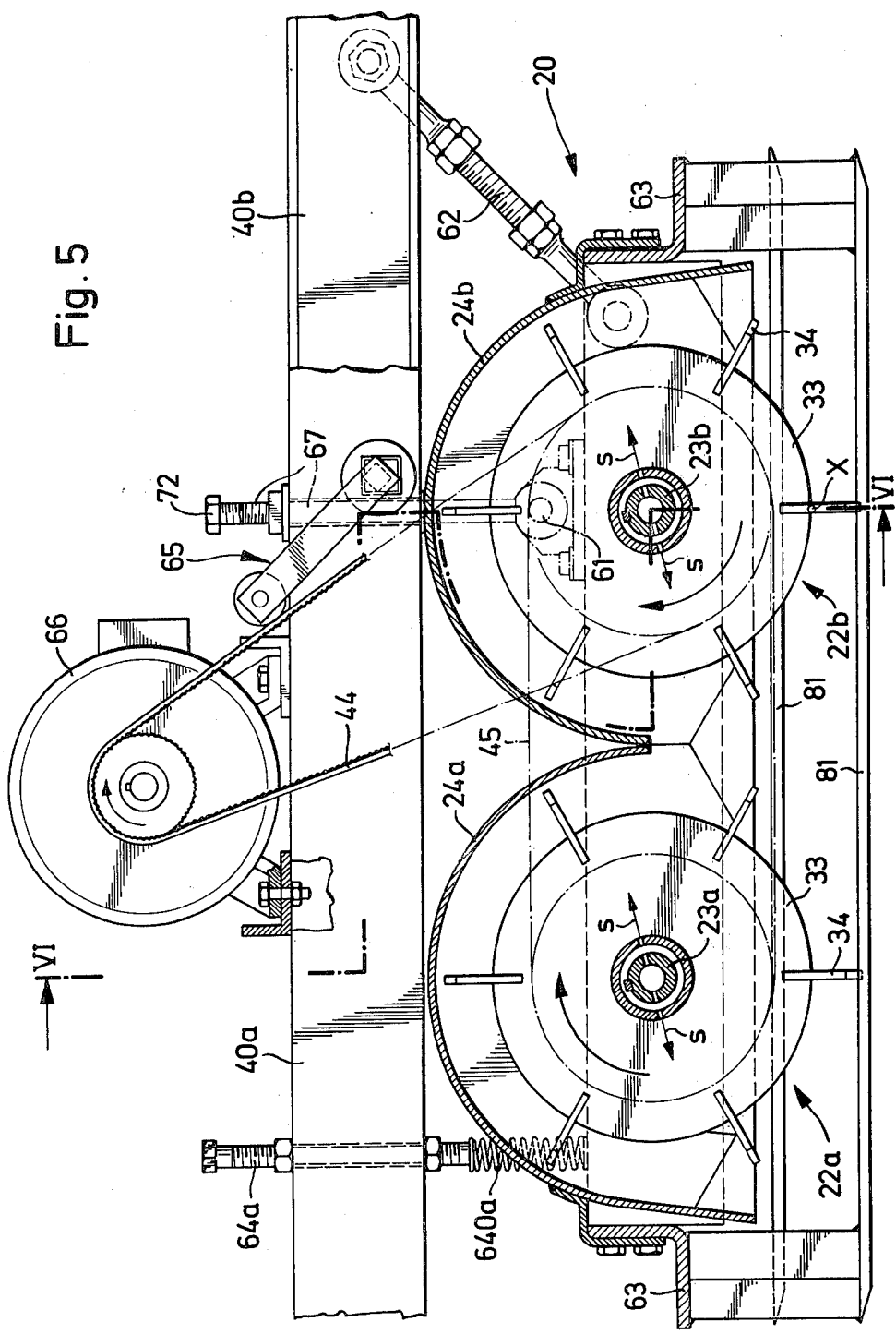
FIG. 5 shows a second embodiment of apparatus according to the invention.
Figure 6:
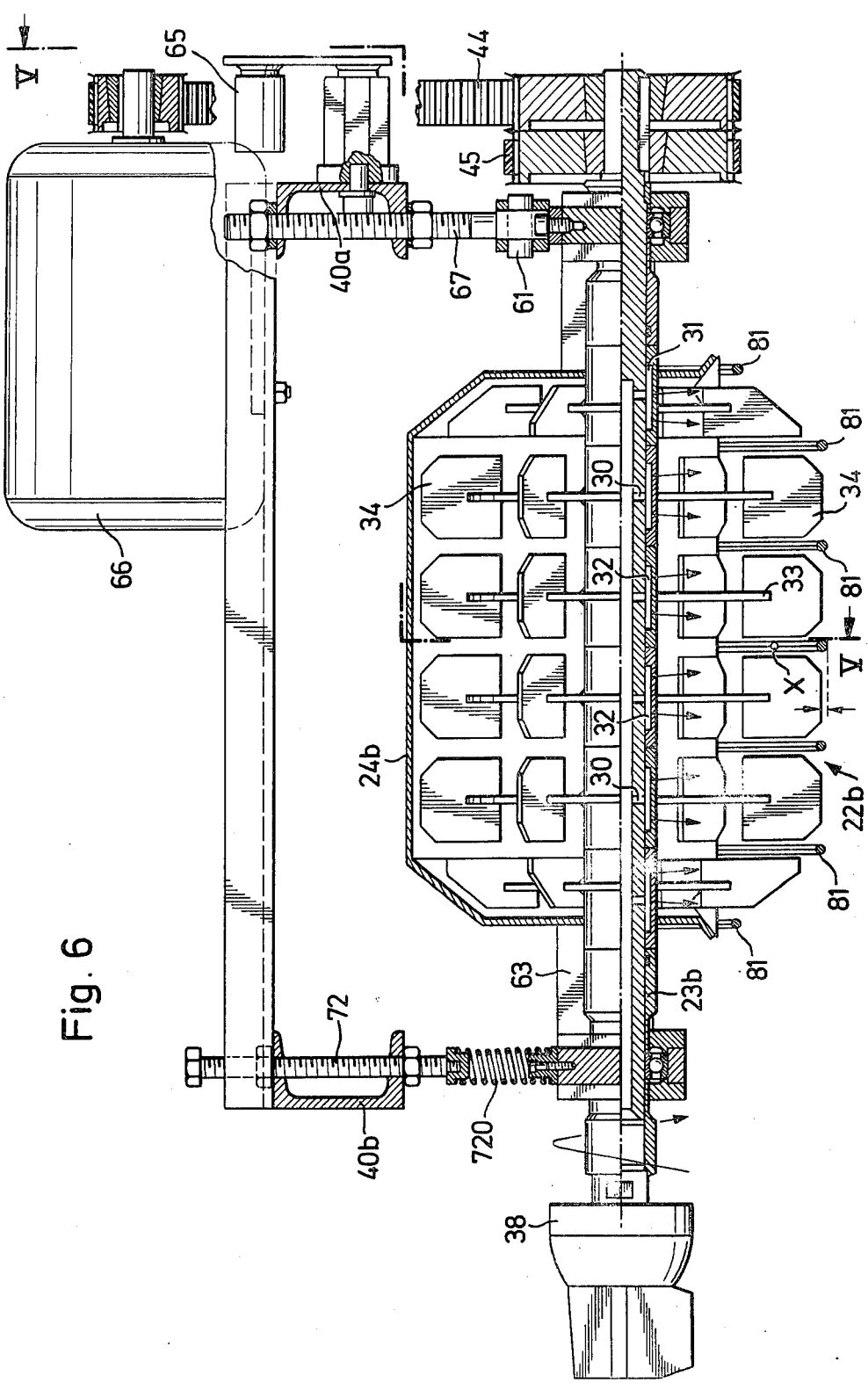
FIG. 6 is a section on the line VI—VI of FIG. 5.

Basically, the embodiment shown in FIGS. 5 and 6 differs from the embodiment shown in FIGS. 2 to 4 only as regards the nature of the suspension. The agitating elements, drive and liquid supply are the same, and so like elements have like references.

In the embodiments shown in FIGS. 5 and 6, the two agitating elements 22a, 22b are mounted in a frame 63 suspended by means of six pins of different lengths on the top two machine-frame girders 40a, 40b. Pin 67 is pivotally connected to frame 63 in a cross-bearing 61. Two additional inclined adjusting bolts 62 provide adequate static suspension of the liquid treatment unit on the girders 40a, 40b. By means of the pin 67 and the pin or bolt 72 secured to the opposite girder 40b and the two adjusting bolts 62, a virtual axis of rotation extending parallel to the axes of the agitating elements through a position X is produced. The unit 20 therefore has provision for limited rotation around the virtual axis and such provision can be used to longitudinally tile the unit 20 relative to the direction of filter belt movement.

The angle of tilt is adjusted by means of two spring adjusters one of which is shown at 64a, each connected to a tension/compression spring as shown at 640a. Adjustment in a plane parallel to the filter-belt plane and transversely to the direction of filter belt movement is provided on one side through the agency of the adjusting screw 72, the same being used to adjust the position of the spindle 23b transversely of the filter belt. By corresponding lowering or raising of the bolt 72 in cooperation with a spring 720 disposed between the screw 72 and spindle 23b, the inclination of the axis of the agitating elements relative to the filter belt 4 can be adjusted.

FIG. 8 shows another embodiment of a liquid treatment unit in association with a drum vacuum filter plant 500, only a small layer of whose surface is shown. Such plants are familiar and therefore need not be described in greater detail.

The liquid treatment unit comprises rotatable agitating elements 220 having agitating vanes 340 secured to discs 330, two substantially semicylindrical covering hoods 240 and a suspension for the elements 220. The suspension can be the same as or similar to the suspension used in the previous embodiments and is therefore not shown. Members 581 shaped to correspond with the drum surface and secured to struts 580 are provided to protect the filter belt 504.

The semicylindrical hoods 240 are double-walled and thus act as heating or cooling jackets 241, a feature which may be useful for some liquid treatments and for some filter cake materials. Sealing engagement between the hood end faces 242 and the filter surface is provided by means of resilient lips 243. Disposed at the front and back of the hoods 240 are adjustable flaps 244 which seal the space enclosed by the hoods. The adjustability of the flaps is symbolized by arrows P.

In contrast to the previous embodiments, the agitating blades 340 are not formed by a number of vane rings; instead, the vanes 340 form just a single vane ring, each vane extending over the whole axial width of the agitating elements. At the places where the members 581 are located, the vanes are formed with corresponding recesses 341.

Figure 10:
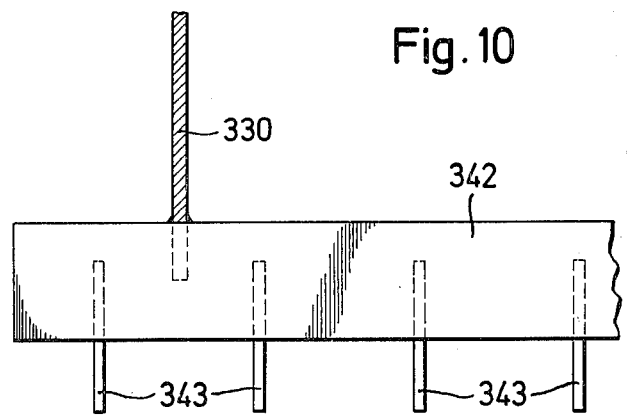
FIG. 10 shows an alternative detail of part of FIG. 9.

FIG. 10 shows part of an alternative form of vane 342 which has a number of teeth 343, a feature which has proved convenient more particularly for dealing with fibrous filter cakes.

Figure 9:
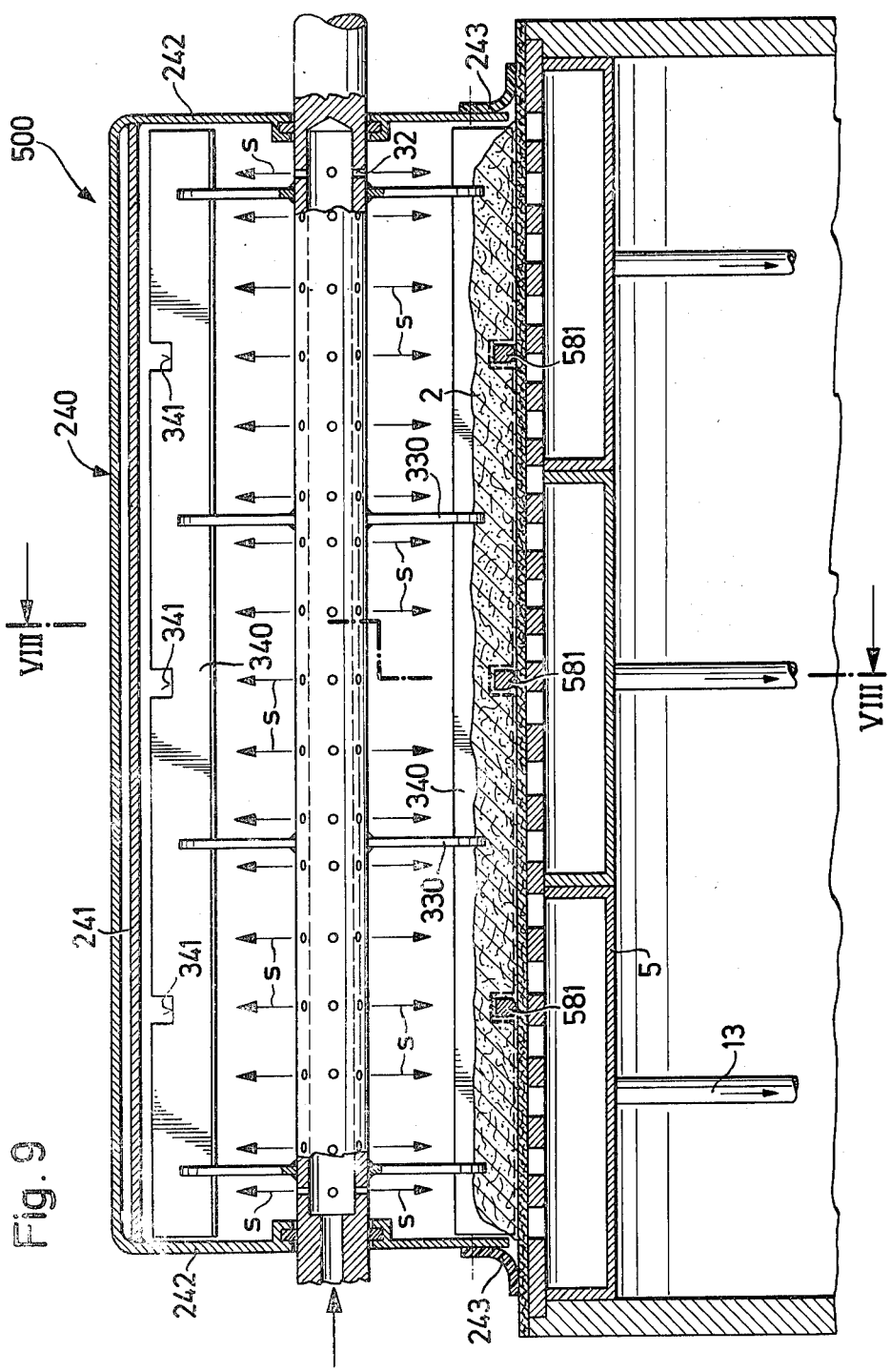
FIG. 9 is a section on the line IX—IX of FIG. 8.
Figure 11:
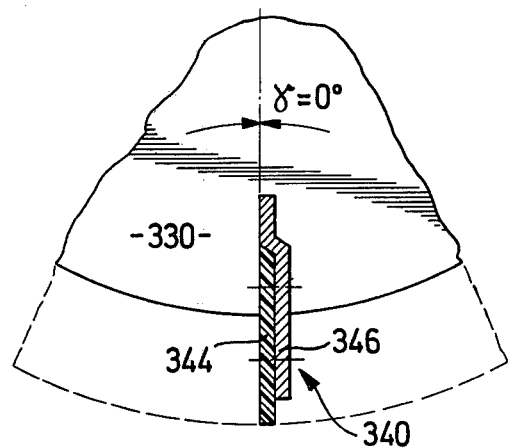
FIGS. 11 to 13 show various forms of an agitator vane or blade.
Figure 12:
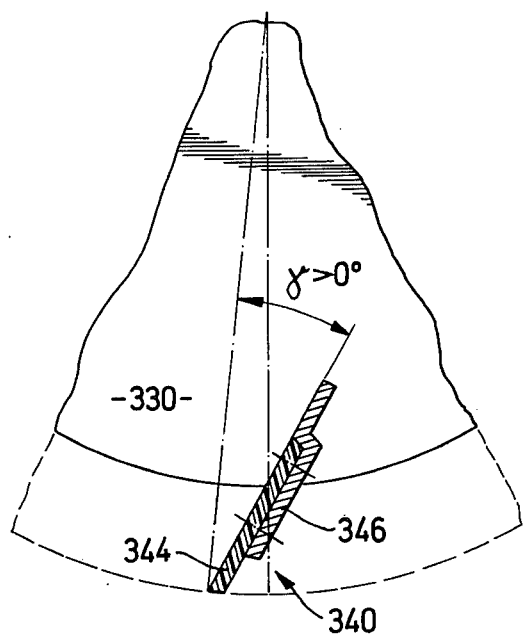
Figure 13:
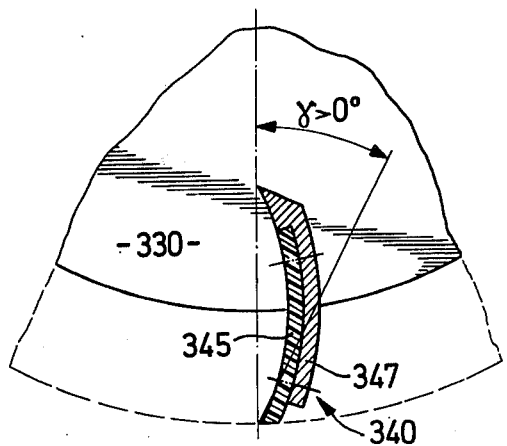

FIGS. 11 to 13 show other types of agitating vanes formed entirely by resilient plates 344, 345 and rigid reinforcing or strengthening plates 346, 347. The vanes of FIG. 11 are disposed in radial planes relative to the rotational axes of the agitating elements, whereas in FIGS. 12 and 13 the vanes are inclined at a positive angle of rake $\gamma$, whilst in FIG. 13 they have a concave curvature as well. Choice of a suitable vane very much depends upon the filter cake material. In general, however, vanes which have a relatively small positive rake of 45° or less and/or which are curved provide better eddying than plane radial vanes. Of course, the various kinds of vane are of use not only for the narrow individual vanes 34 of FIGS. 2 to 6 but also for the wide vanes 340 of FIGS. 8 to 10.

Only two agitating elements are shown for each of the liquid treatment units in the embodiments described above but a number of rotating agitating elements can readily be provided.

Although the liquid treatment unit has been shown as mounted in the filter plants, such units can be devised as a separate mobile unit and used as such in cooperation with existing filter plants.

Also, the filters and filter belts of the embodiments are driven continuously, but the treatment unit according to the invention is of use with intermittently operating filter plants. Also, the filters, instead of being moved past the liquid treatment unit could be stationary and such units could move relatively to the filters. For instance, the treatment unit can be mounted on the machine frame of the filter plant, by means of a motor-driven trolley. The only important consideration is that the filters and the liquid treatment unit be movable relative to one another.

What is claimed is:

1. A belt filter apparatus comprising as a filtering medium an endless belt of filter cloth arranged to have filtering section including a separating zone followed by a liquid treatment zone; vacuum trays disposed beneath said filtering section means for feeding material to be filtered into said separating zone at least one agitator means positioned above said filtering section in said liquid treatment zone, said agitator means including at least one rotatable agitator having an axis of rotation parallel to and extending across the filter cloth and comprising a plurality of agitating vanes extending substantially radially from said axis of rotation; a semicylindrical hood covering the agitator, the central longitudinal axis of the hood being coaxial to the axis of rotation of the agitator; and means for supplying treatment liquid to the agitator within said hood; and further comprising means for generating relative movement between said filter cloth and said agitator means and means for rotating said agitator in a direction opposite to that of said relative movement.

2. An apparatus according to claim 1 including U-shaped protective members lying in a plane substantially transverse to the axis of the agitator and extending out of the hood just beyond the periphery of said agitating vanes.

3. An apparatus according to claim 1 wherein the agitating vanes are inclined forwardly in the direction of rotation and outwardly away from the axis of the agitator.

4. An apparatus according to claim 1 wherein the agitating vanes have a concave curvature relative to the direction of rotation of the agitator.

5. An apparatus according to claim 1 wherein the agitating vanes are resiliently bendable.

6. An apparatus according to claim 1 wherein the hood is double-walled as a temperature exchanging jacket.

7. An apparatus according to claim 1 including lips sealing the end faces of the hood.

8. An apparatus according to claim 1 wherein the agitator means comprises two rotatable agitators covered with a common cover which is built of two adjacent semicylindrical hoods, and wherein said means for rotating said agitator includes drive means for rotating both of said agitators.

9. An apparatus according to claim 1 wherein the agitator includes a hollow spindle having nozzles on the peripheral surface thereof and said liquid supply means includes a coupling on said spindle adapted for connection to a treatment liquid supply line.

10. An apparatus according to claim 9 wherein said hollow spindle comprises two coaxial tubes and each nozzle comprises two orifices each connected to a different one of said tubes.

11. An apparatus according to claim 1 including means securing said hood so that the hood is adjustable relative to the filter cloth.

12. An apparatus according to claim 11 wherein said securing means includes fluidic means for raising and lowering said hood relative to said filter cloth.

* * * * *